(12) United States Patent
Menezes et al.

(10) Patent No.: US 8,706,861 B2
(45) Date of Patent: Apr. 22, 2014

(54) DYNAMICALLY ALLOCATING NETWORK RESOURCES FOR COMMUNICATION SESSION

(75) Inventors: Pascal Menezes, Bellevue, WA (US); Wajih Yahyaoui, Bellevue, WA (US); Kapil Sharma, Woodinville, WA (US); Warren Barkley, Preston, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 13/229,215

(22) Filed: Sep. 9, 2011

(65) Prior Publication Data
US 2013/0067042 A1 Mar. 14, 2013

(51) Int. Cl.
*G06F 15/173* (2006.01)

(52) U.S. Cl.
USPC .......................... 709/223; 709/229; 370/230

(58) Field of Classification Search
USPC ................. 709/229, 203, 217, 223, 224, 227;
370/230, 395.1, 468
See application file for complete search history.

(56) References Cited

U.S. PATENT DOCUMENTS

| | | | |
|---|---|---|---|
| 7,069,577 B2 | 6/2006 | Geile et al. | |
| 7,289,441 B1* | 10/2007 | Barach | 370/230 |
| 7,554,922 B2 | 6/2009 | Vega-Garcia et al. | |
| 7,577,161 B2 | 8/2009 | Li et al. | |
| 7,774,468 B1* | 8/2010 | Nag et al. | 709/226 |
| 8,265,676 B2* | 9/2012 | Omar | 455/509 |
| 8,291,044 B2* | 10/2012 | Storrie | 709/219 |
| 8,301,744 B2* | 10/2012 | Bogovic et al. | 709/223 |
| 8,472,317 B2* | 6/2013 | You et al. | 370/230 |
| 2004/0192317 A1* | 9/2004 | Lu et al. | 455/450 |
| 2007/0086366 A1 | 4/2007 | Luo et al. | |
| 2007/0133403 A1* | 6/2007 | Hepworth et al. | 370/229 |
| 2008/0162720 A1* | 7/2008 | Gulati et al. | 709/238 |
| 2008/0225712 A1* | 9/2008 | Lange | 370/230.1 |
| 2008/0253390 A1* | 10/2008 | Das et al. | 370/465 |
| 2008/0285543 A1* | 11/2008 | Qiu et al. | 370/352 |
| 2009/0300671 A1* | 12/2009 | Scott et al. | 725/27 |
| 2010/0034197 A1* | 2/2010 | Das et al. | 370/352 |
| 2010/0034367 A1* | 2/2010 | Das et al. | 379/202.01 |
| 2010/0262700 A1* | 10/2010 | Whynot et al. | 709/227 |
| 2011/0202405 A1* | 8/2011 | Clark et al. | 705/14.49 |
| 2012/0064908 A1* | 3/2012 | Fox et al. | 455/452.2 |
| 2012/0170767 A1* | 7/2012 | Astrom et al. | 381/77 |
| 2013/0003720 A1* | 1/2013 | Tasker | 370/352 |
| 2013/0028268 A1* | 1/2013 | Nag | 370/468 |

OTHER PUBLICATIONS

"Configuring Telephony and Conferencing", Retrieved at <<http://msdn.microsoft.com/en-us/library/bb457120.aspx>>, Nov. 3, 2005, pp. 25.
"Unifying the Subnets of the Sample Network", Retrieved at <<http://msdn.microsoft.com/en-us/library/bb742485.aspx>>, Sep. 3, 1999, pp. 13.
"QoS for IP videoconferencing", Retrieved at <<http://findarticles.com/p/articles/mi_m0CMN/is_6_41/ai_n6080556/>>, Jun. 2004, pp. 3.
"Delivering a Cisco TelePresence Network Connection Service", Retrieved at <<http://www.cisco.com/en/US/solutions/collateral/ns341/ns524/ns546/ns670/ns672/net_implementation_white_paper0900aecd805bbda0.pdf>>, Retrieved Date: Jul. 1, 2011, pp. 9.

* cited by examiner

*Primary Examiner* — Lashonda Jacobs
(74) *Attorney, Agent, or Firm* — Sonia Cooper; Alin Corie; Micky Minhas

(57) ABSTRACT

A primary call admission controller (CAC) system receives a request from a client to allocate a network resource such as a network bandwidth. The primary CAC system may determine subordinate CAC to delegate the allocation and transfer the request to the subordinate CAC. Subsequently, the subordinate CAC analyzes the communication session attributes to determine an available network resource for the communication session. Upon a positive determination, the subordinate CAC allocates the network resource and signals the allocation up the network chain to the primary CAC and the client.

19 Claims, 6 Drawing Sheets

DYNAMICALLY ALLOCATING NETWORK RESOURCES FOR COMMUNICATION SESSION

BACKGROUND

Electronic communication is a common daily experience for many people. Cost-effective and constantly available video and audio communications are enhancing life as a product of continued deployment of data networks. Due to modern advances, integrated devices enable communications in variety of situations and for a variety of demand. Multi-purpose devices have enabled communications to be available on demand and regardless of location, time, and other limitations. Network capabilities enable video and audio communications in enhanced platforms such as social applications. Social applications further drive the demand for video and audio communications.

Present solutions for high bandwidth consuming communication applications utilize dedicated network resources. Some providers install dedicated network resources to guarantee service according to application demand such as direct video conferencing. Dedicated network resources assure uptime and availability. However, dedicated network resources come with high costs. Dedicated network resources are also inefficient due to inability to re-orient for other purposes. Additionally, underutilization is common theme for such systems. Most dedicated network resources are underutilized and only host services during a fraction of uptime. As a result, many organizations spend excessive costs for guaranteed service through dedicated network resources.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to dynamically allocating a network resource for a communication session. A system according to embodiments may receive a request for a communication session. The system may determine session attributes of the communication session. Subsequently, the system may determine an availability of a network resource for the communication session. Upon availability, the system may allocate the network resource for the communication session.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
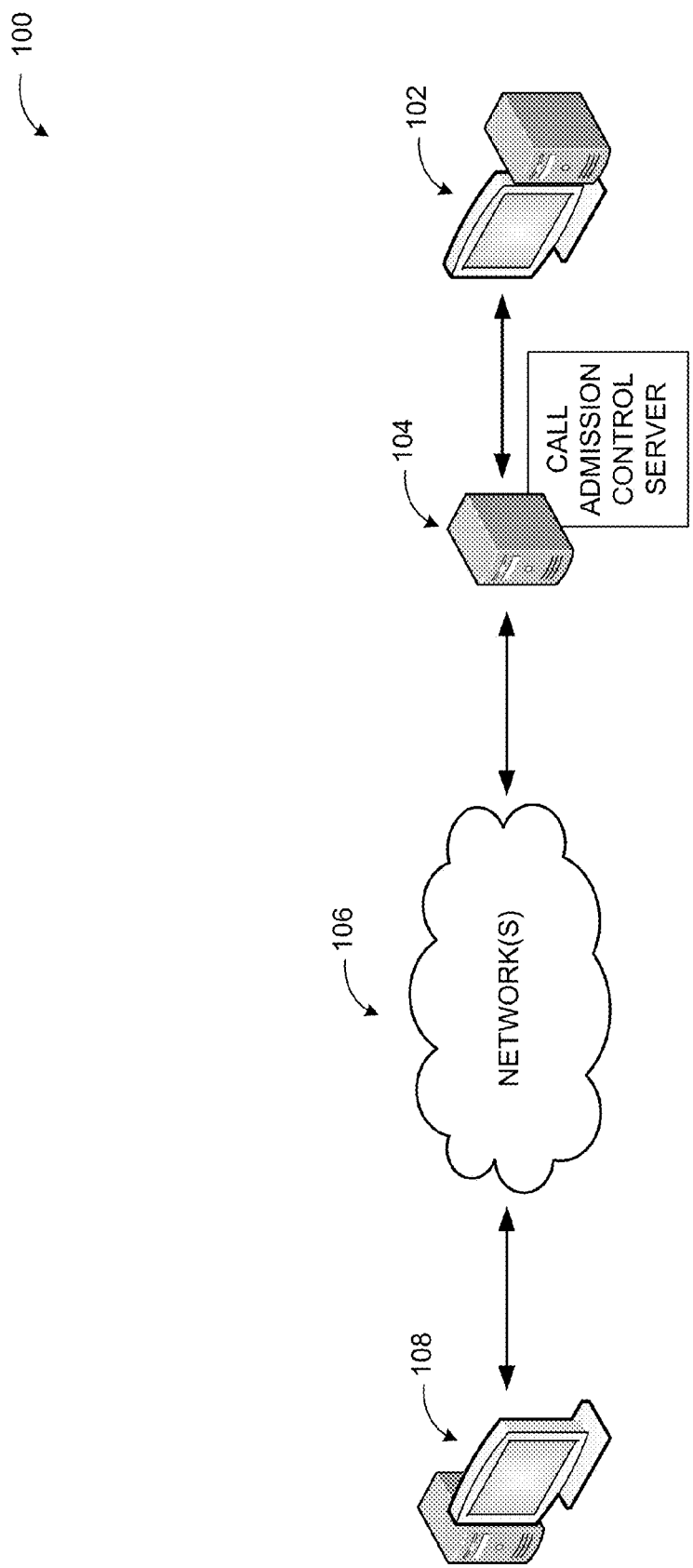
FIG. 1 illustrates components of a system dynamically allocating a network resource for a communication session according to embodiments.

As briefly described above, a system may receive a request for a communication session. The communication session may be a video conference, an audio call, etc. The system may determine session attributes of the communication session. Attributes may include internet protocol (IP), port addresses, class of service (CoS), etc. The system may determine availability of a network resource for the communication system according to the session attributes. Upon availability, the system may allocate the network resource for the communication session. The system may signal the allocation status to upstream applications.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

According to embodiments, the system may be a communications system such as a call admission controller (CAC) system. A CAC system may be a standalone server managing communication sessions between clients and network resources. Alternatively, a CAC system may include multiple CAC servers delegating communications processes. In an example scenario a primary CAC server may route communication sessions based on a class of service (CoS) such as a video conference to a subordinate CAC server. The subordinate CAC server may be a video CAC server managing the communication session between a client and the network resource such as network bandwidth. Alternatively a CAC system may be software based and be executed as part of a communications management system. In another scenario, a CAC system may be an application program interface (API) providing services to manage communications session between clients and network resources.

Throughout this specification, the term "platform" may be a combination of software and hardware components for providing communication services such as audio calls or video conferences. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 illustrates components of a system dynamically allocating a network resource for a communication session according to embodiments, where a CAC server 104 may manage a communication session in diagram 100. According to an embodiment, a client 102 may transmit a request for a communication session to a CAC server 104. The request may be an initiation of a communication session. An example may be a client's attempt to establish a communication session such as a video conference with another client 108.

The CAC server 104 may receive the request for the communication session. The CAC server may determine attributes of the communication session to analyze available network resource for the communication session. An example may be a CAC server's determination of available bandwidth in the network 106 to sustain the communication session. Upon a successful determination, the CAC server 104 may allocate the network resource to sustain the communication session. Allocation may include duration and characteristics attributes. An example may be a time slot (including timestamps) and a bandwidth size of a network resource allocation. Allocation of the network resource may prevent other network controller(s) to assign the allocated resource to other utilization through the duration of the allocation.

The duration and characteristics of the allocation may be subject to network policies. In an example scenario, an allocated bandwidth may be de-allocated if unused for a predetermined time. In another embodiment, a CAC server or another network controller may change the characteristics of the allocation upon network policy rules. In an example, the allocation may be diminished due to network congestion. An example scenario may be a taxed network triggering network policy rules to lower available bandwidth to an allocation such as an allocated network bandwidth for a video conference session.

Figure 2:
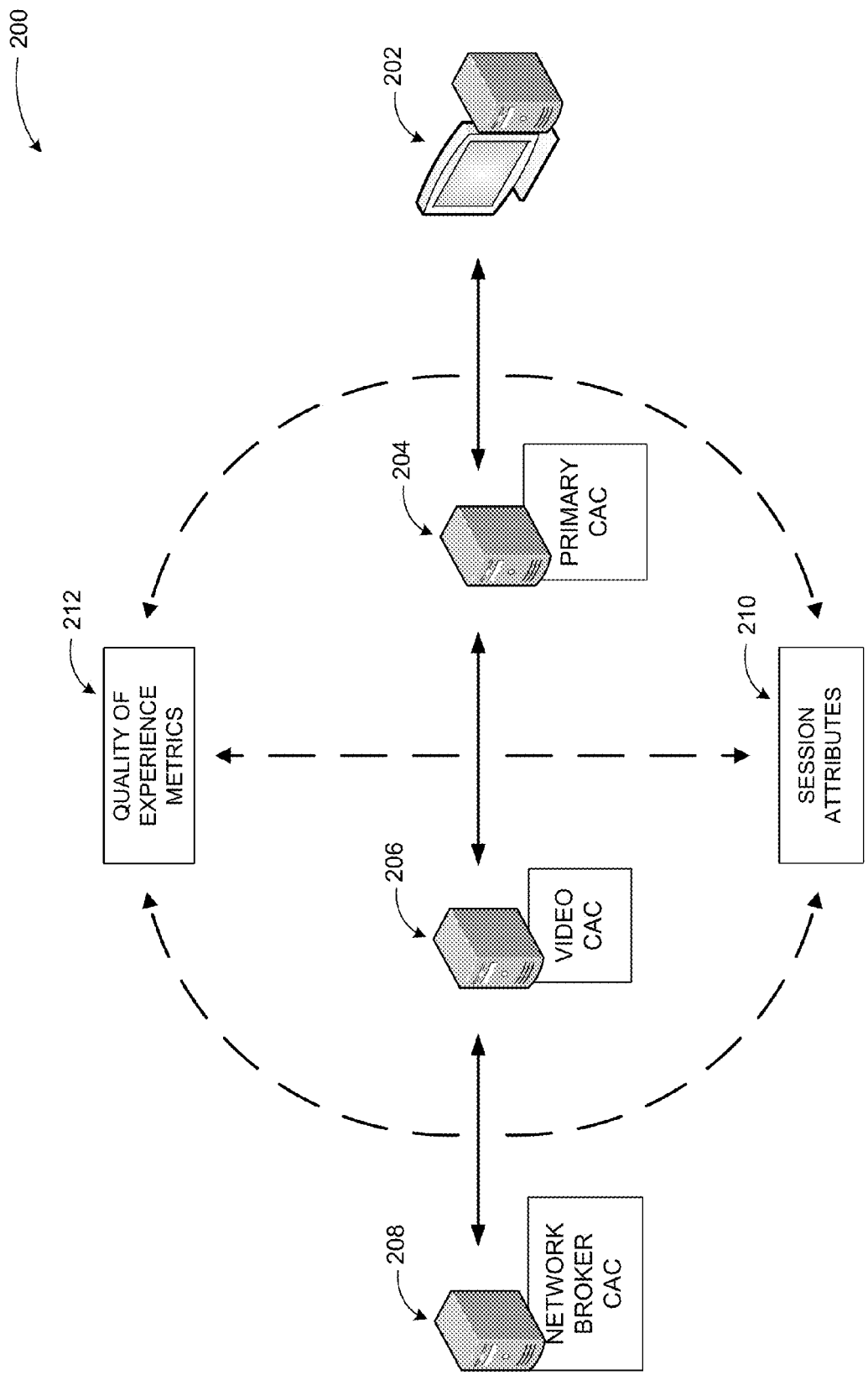
FIG. 2 illustrates an example system dynamically allocating a network resource according to an embodiment.

FIG. 2 illustrates an example system dynamically allocating a network resource according to an embodiment. In diagram 200, a client 202 may transmit a request for a communication session to a primary CAC 204. The primary CAC 204 may manage communications sessions for variety of applications and services within the network. The primary CAC 204 may delegate communications based on a class of service (CoS).

The primary CAC 204 may analyze the session attributes 210 of the communication session request. A video conference CoS may lead to a determination of a corresponding subordinate CAC to allocate the network resource. Upon determining a video CAC 206 as the subordinate, the primary CAC 204 may store the request to allocate the network resource in the primary CAC's data store and transmit the request to the video CAC 206. The request may be stored in the primary CAC's data store to subsequently match an affirmative signal from the subordinate indicating an available network resource. The primary CAC 204 may allocate the network resource upon matching the affirmative signal to the stored request. Alternatively, the primary CAC may not allow the request to proceed to the video CAC upon an unavailable network resource determination. An example may be insufficient network bandwidth between primary CAC 204 and video CAC 206.

The video CAC 206 may manage variety of services in regards to the communication session. The services may include management of the video session such as compressing/uncompressing, formatting, and quality of service management of the video streams. Additionally, the video CAC 206 may further determine other subordinate CAC to allocate the network resource based on the session attributes 210. Upon determining a network broker CAC 208 as a subordinate, the video CAC 206 may store the request in the video CAC's data store and transmit the request to allocate network resource to network broker CAC 208.

Subsequently, the network broker CAC 208, may determine availability of the network resource and allocate the network resource. The allocation may be through the duration of the communication session. Alternatively, the allocation may be based on preset values for duration and characteristics such as network bandwidth size according to network policy.

Additionally, primary CAC 204, video CAC 206, and network broker CAC 208 may monitor quality of experience metrics 212 during the allocation of the network resource and during the communication session. The quality of experience (QoE) metrics may be transmitted by the monitoring CACs to other network management components for recording or management purposes. Alternatively, the CACs may manage the network resource based on the QoE metrics. An example may be increase of a network bandwidth upon a subpar QoE determination for a communication session.

Alternatively, neither the video CAC 206 nor network broker CAC 208 may allow the request to allocate the network resource upon a determination of unavailable network resource at their respective determination steps. A negative determination at each step in a subordinate CAC or primary CAC analysis may stop the network resource allocation. The negative determination may generate a transmission of the negative determination signal to a subordinate CAC, a primary CAC, or client up the network chain. The client 202 may display the negative determination of unavailable network resource and indicate inability to establish the communication session.

Figure 3:
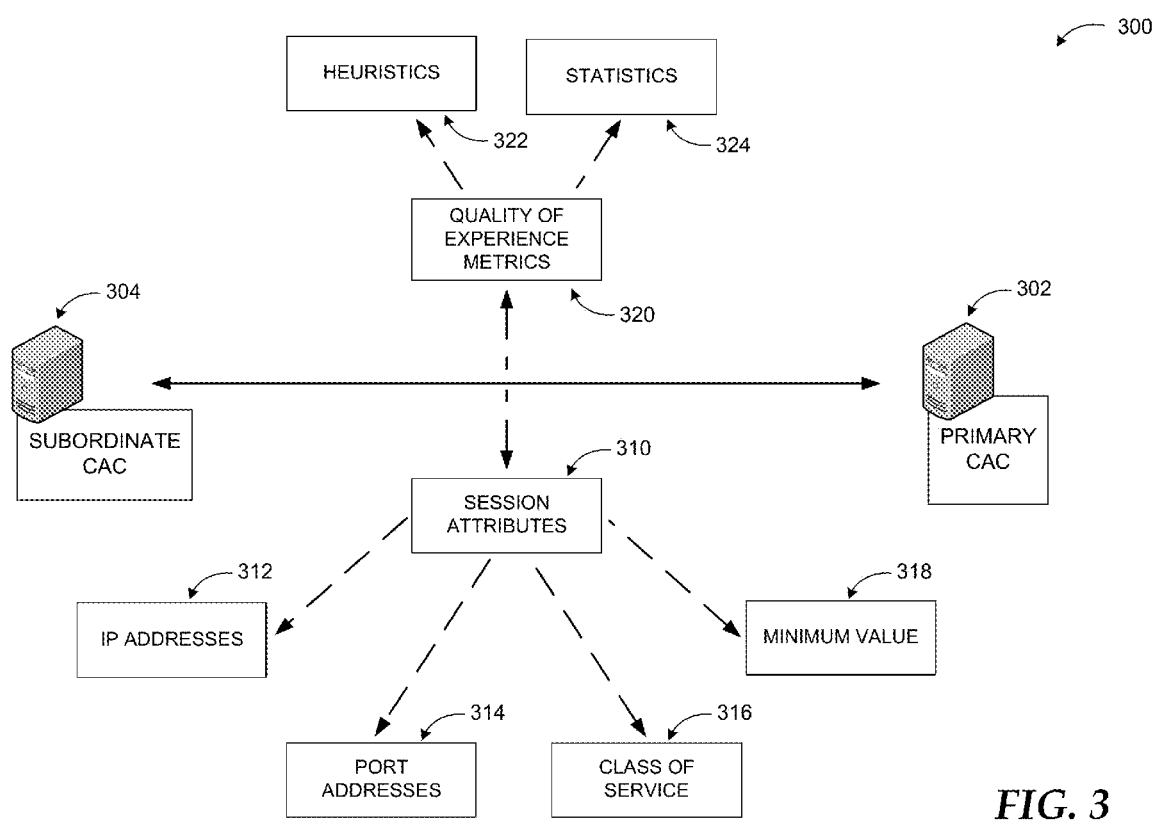
FIG. 3 illustrates components of another example system dynamically allocating a network resource according to an embodiment.

FIG. 3 illustrates components of another example system dynamically allocating a network resource according to an embodiment. In a system according to embodiments, diagram 300 displays an example primary CAC 302 and subordinate CAC 304. The primary CAC 302 may determine an availability of a network resource requested by a communication session. The primary CAC 302 may pass the request on to the subordinate CAC 304 upon subsequent determination of availability.

Any CAC between a client and the network resource may analyze session attributes 310 to determine the availability of the network resource for the communication session as discussed above. The session attributes 310 of a communication session may include IP addresses 312, port addresses 314, class of service 316, and minimum value 318. IP addresses may include source and destination IP addresses. Analysis of the network resource may determine whether destination IP address is reachable from the source IP address.

Similar to IP addresses, port addresses may include source and destination port addresses. Analysis of the network resource may determine whether the communication session may be established from the source port address to the destination port address through the network resource. In an example scenario, blocked destination port may lead to negative determination of an available network resource for allocation.

Class of service (CoS) 316 may be an audio call, a video conference, etc. Determination of CoS may enable routing to appropriate subordinate CAC for managing the communication session as discussed above. Additionally, minimum value 318 attribute may include specifics values of the network resource such a bandwidth minimum value in order to allocate a sufficient network resource for the communication session.

In another embodiment, the CACs may monitor QoE metrics 320. Heuristics 322 may include deterministic values of time and duration of a communication session. The deterministic values may be estimated and monitored. The heuristics 322 may be utilized to optimize an allocated network resource. An example may be re-routing a request for a network resource to a backup network when a communication session is estimated to need a network resource beyond available network resources in a primary network.

Additionally, statistics 324 may be monitored and recorded by CACs. The recorded information may be utilized in network management or transferred to other network managing resources as described above.

The example systems in FIG. 1 through 3 have been described with specific devices, applications, and interactions. Embodiments are not limited to systems according to these example configurations. A system for dynamically allocating a network resource for a communication session may be implemented in configurations employing fewer or additional components and performing other tasks. Although embodiments refer to audio and video based communication sessions, CACs may also dynamically allocate a network resource for other communication session types. An example may be a hybrid video conferencing session also sharing documents and text based communications. Furthermore, specific protocols and/or interfaces may be implemented in a similar manner using the principles described herein.

Figure 4:
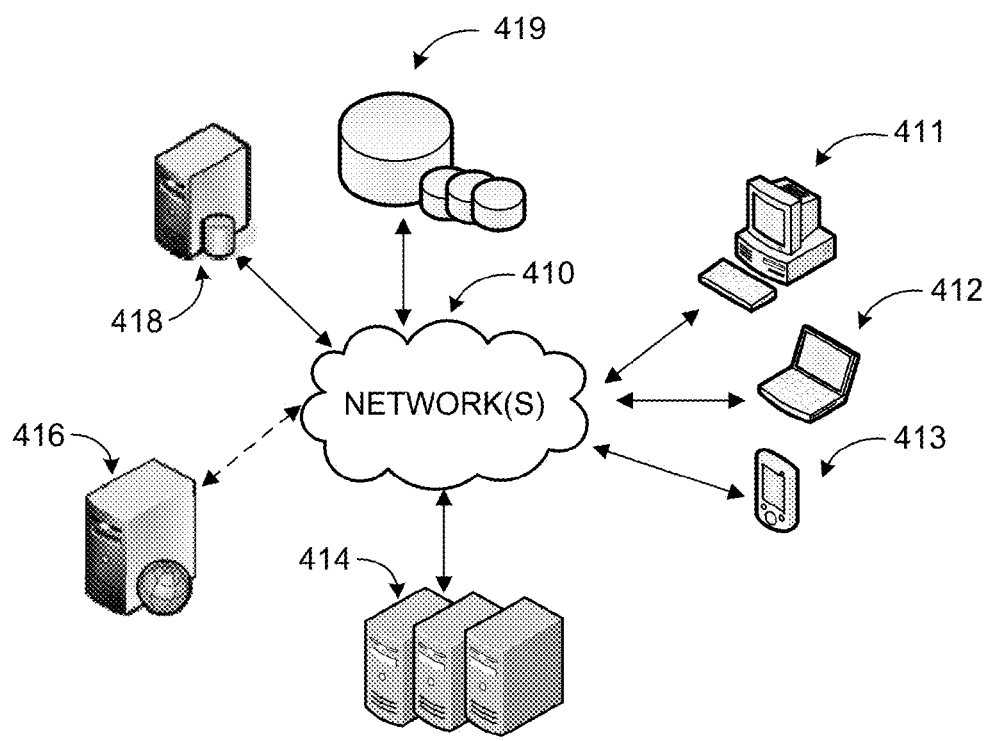
FIG. 4 is a networked environment, where a system according to embodiments may be implemented.

FIG. 4 is an example networked environment, where embodiments may be implemented. A system for dynamically allocating a network resource may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may analyze communication session attributes and determine an available network resource to accommodate the communication session. The application may store the request for a communication session in data store(s) 419 directly or through database server 418. The application may transfer the request to a subordinate (e.g. a video CAC) to allocate the network resource for the communication session originating from client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to dynamically allocate a network resource for a communication session. Furthermore, the networked environments discussed in FIG. 4 are for illustration purposes only. Embodiments are not limited to the example applications, modules, or processes.

Figure 5:
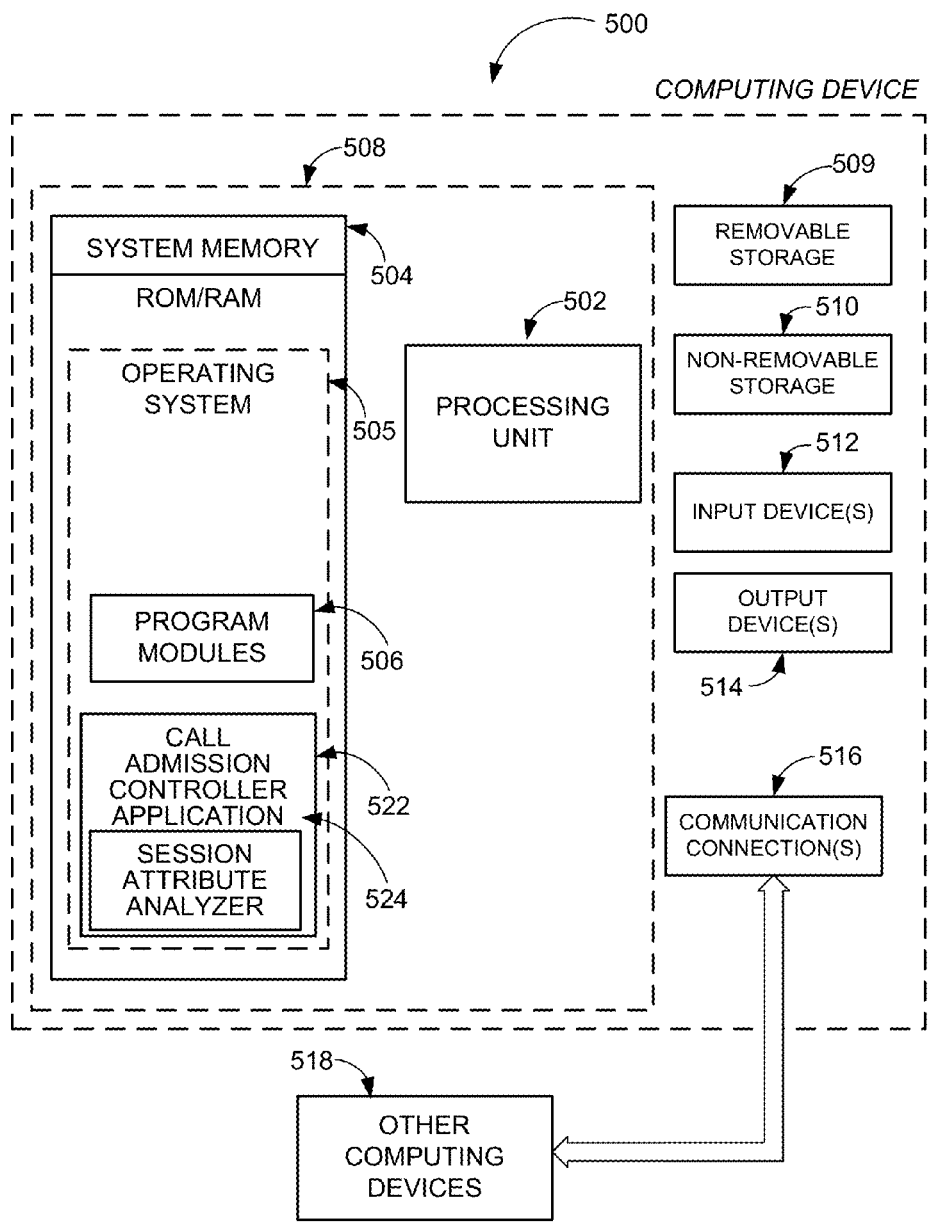
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a call admission controller application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, call admission controller (CAC) application 522, and session attribute analyzer 524.

Session attribute analyzer 524 may enable a computing device 500 to identify a network resource for the communication session. Through the session attribute analyzer 524, CAC application 522 may allocate the network resource for the communication session. The CAC application 522 may allocate a network resource such as a sufficient bandwidth for the communication session such as a video conference to ensure a successful communication session. CAC application 522 and session attribute analyzer 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/ or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
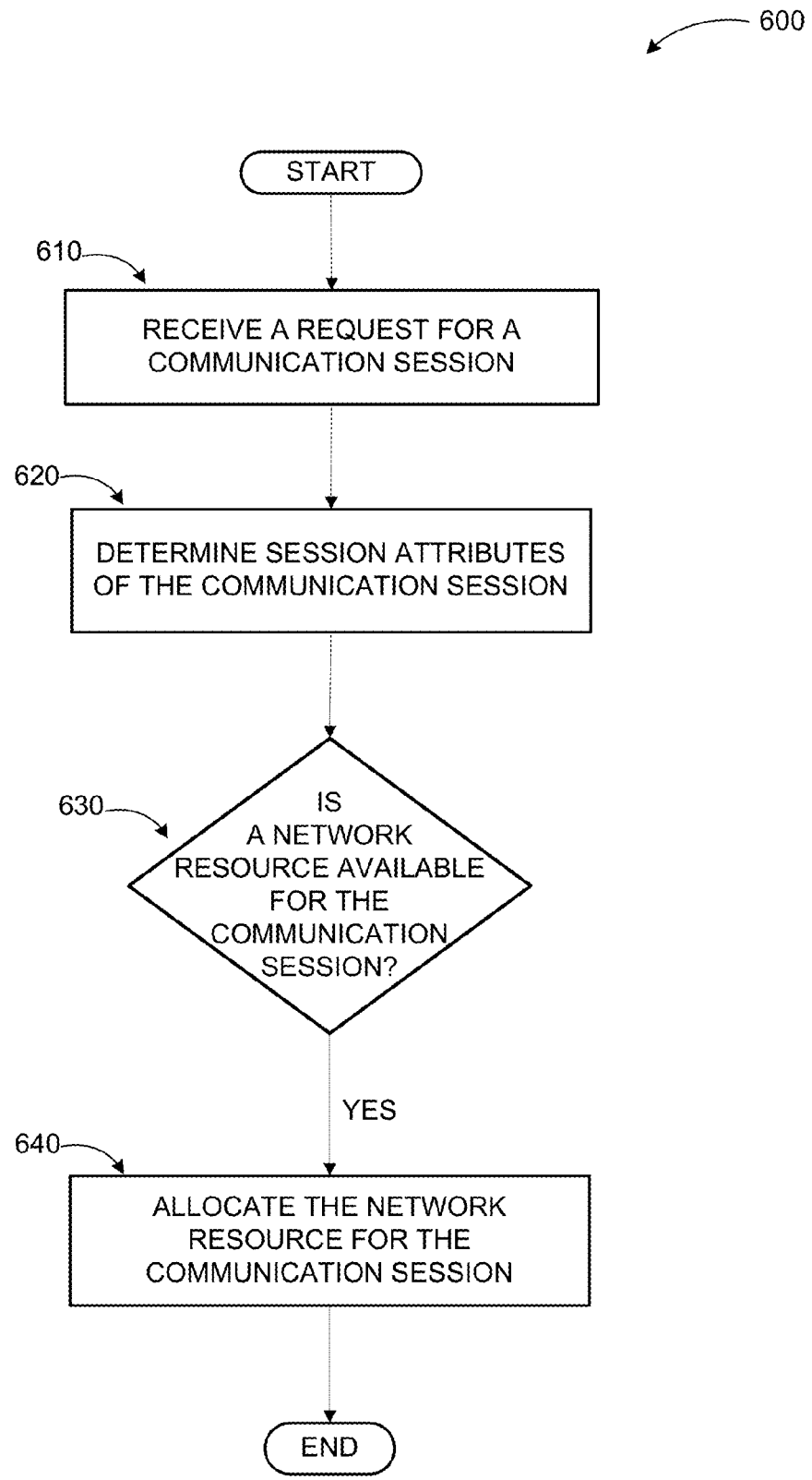
FIG. 6 illustrates a logic flow diagram for a process of dynamically allocating a network resource for a communication session according to embodiments.

FIG. 6 illustrates a logic flow diagram for a process of dynamically allocating a network resource for a communication session according to embodiments. Process 600 may be implemented on a computing device that may manage communication sessions such as a video conference. The communication sessions may include an audio call, an application sharing session, a data sharing session, a whiteboard sharing session, and/or a video conference.

Process 600 begins with operation 610, where a CAC system may receive a request for a communication session. The system receiving the request may be a primary CAC that may delegate the communication session to subordinate CACs. At operation 620, the system may determine session attributes of the communication session. The communication session may have attributes including IP addresses, port addresses, class of service (CoS), and minimum value. The determination of CoS may enable the primary CAC to route the request to the appropriate subordinate CAC such as video CAC for a video conference based communication session.

At decision node 630, the system may determine an availability of a network resource for the communication session. Depending on the communication session's attributes the system may determine a sufficient network bandwidth to support the communication session. At operation 640, the system may allocate the network resource for the communication session.

The operations included in process 600 are for illustration purposes. Dynamically allocating a network resource for a communication session may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for dynamically allocating a network resource for a communication session, the computing device comprising:
  a memory;
  a processor coupled to the memory, the processor executing a call admission controller (CAC) application, wherein the CAC application is configured to:
    receive a request for the communication session;
    determine one or more session attributes of the communication session;
    determine one or more network resources for the communication session based on the session attributes;
    determine an availability of the network resources;
    re-route the request to a backup network in response to an estimation of the communication session needing at least one of the resources beyond the availability of the network resources;
    allocate the network resources for the communication session based on the availability of each network resource; and
    manage services associated with the communication session, wherein the services include management of at least one from a set of: a compressing, an uncompressing, a formatting, and a quality of service associated with the communication session.

2. The computing device of claim 1, wherein the communication session is at least one from a set of: an audio call, an application sharing session, a data sharing session, a whiteboard sharing session, and a video conference.

3. The computing device of claim 1, wherein the network resource is a sufficient network bandwidth to sustain the communication session.

4. The computing device of claim 1, wherein the session attributes include at least one from a set of source and destination Internet protocol (IP) addresses, source and destination port addresses, a class of service (CoS), and a minimum value.

5. The computing device of claim 4, wherein the CAC application is further configured to:
  determine the availability of each network resource according to a reachability of the destination IP and port addresses.

6. The computing device of claim 1, wherein the CAC application is further configured to:
prevent other communication sessions and the services from using the allocated network resources.

7. The computing device of claim 1, wherein the CAC application is further configured to:
transmit a signal indicating unavailability of a network resource to a client upon a determination of an unavailability of the network resource.

8. The computing device of claim 1, wherein the CAC application is further configured to:
allocate the network resources according to a duration and a bandwidth associated with the requested communication session.

9. The computing device of claim 1, wherein the CAC application is further configured to:
de-allocate an allocated network resource upon a lack of use for a predetermined time according to a network policy.

10. The computing device of claim 1, wherein the request is an initiation of the communication session.

11. A computing device for dynamically allocating a network resource for a communication session, the computing device comprising:
a memory;
a processor coupled to the memory, the processor executing a call admission controller (CAC) application, wherein the CAC application is configured to:
receive a request for the communication session;
determine one or more session attributes of the communication session;
determine one or more network resources for the communication session based on the session attributes;
determine at least one subordinate CAC application according to the session attributes to analyze an availability of each network resource for the communication session;
transmit the request to the at least one subordinate CAC application;
receive a signal indicating the availability of a network resource from the subordinate CAC application;
allocate the network resource for the communication session;
monitor quality of experience (QoE) metrics associated with the communication session to optimize the network resource;
increase a network bandwidth of the network resource in response to determining a subpar QoE metric; and
monitor and record statistics associated with the communication session to utilize in network management and to transfer other network management resources.

12. The computing device of claim 11, wherein the CAC application is further configured to:
determine the subordinate CAC application according to a class of service (CoS) session attribute of the communication session.

13. The computing device of claim 11, wherein the CAC application is further configured to:
store the signal in a data store; and
match the signal to the request prior to allocating the network resource.

14. The computing device of claim 11, wherein the CAC application is further configured to:
compare a minimum value session attribute to a characteristic of the one or more network resources to determine the availability.

15. The computing device of claim 11, wherein the CAC application is further configured to:
transmit the request to the subordinate CAC application upon determining the availability of the network resource between the CAC application and the subordinate CAC application.

16. The computing device of claim 11, wherein the CAC application is further configured to:
re-route the request to a backup network upon determining an unavailability of a network resource.

17. A computer-readable memory device with instructions stored thereon for dynamically allocating a network resource for a communication session, the instructions comprising:
receiving a request for the communication session;
determining session attributes of the communication session;
determining one or more network resources for the communication session based on the session attributes;
determining a subordinate call admission controller (CAC) application according to a class of service (CoS) session attribute of the requested communication session;
transmitting the request to the subordinate CAC application;
receiving a signal indicating an availability of the one or more network resources from the subordinate CAC application;
re-routing the request to a backup network in response to an estimation of the communication session needing at least one of the resources beyond the availability of the network resources;
allocating the network resources for the communication session according to at least one from a set of: a duration and a bandwidth associated with the communication session;
manage services associated with the communication session, wherein the services include management of at least one from a set of: a compressing, an uncompressing, a formatting, and a quality of service associated with the communication session
monitoring quality of experience (QoE) metrics associated with the communication session to optimize the network resources;
increasing the network bandwidth in response to determining a subpar QoE metric associated with the network resources; and
monitoring and recording statistics associated with the communication session to utilize in network management and to transfer other network management resources.

18. The computer-readable memory device of claim 17, wherein the QoE metrics include at least one from a set of: a heuristic and a statistic.

19. The computer-readable memory device of claim 18, wherein the heuristic includes deterministic values for time and duration of the communication session to estimate and monitor the communication session.

\* \* \* \* \*